(12) United States Patent
Kern et al.

(10) Patent No.: US 12,370,890 B2
(45) Date of Patent: Jul. 29, 2025

(54) SNOWMOBILE THROTTLE CONTROL SYSTEM

(71) Applicant: Polaris Industries Inc., Medina, MN (US)

(72) Inventors: Peter P. Kern, Greenbush, MN (US); Jeremy Eichenberger, Warroad, MN (US); Joshua Mickelson, Roseau, MN (US); Jeremy Hughes, Roseau, MN (US); Jeffrey Johnson, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/209,185

(22) Filed: Jun. 13, 2023

(65) Prior Publication Data

US 2023/0398864 A1    Dec. 14, 2023

Related U.S. Application Data

(60) Provisional application No. 63/351,647, filed on Jun. 13, 2022.

(51) Int. Cl.
| | | |
|---|---|---|
| *B60K 26/02* | (2006.01) | |
| *B60H 1/22* | (2006.01) | |
| *B60K 26/04* | (2006.01) | |
| *G05G 1/04* | (2006.01) | |
| *B62K 23/02* | (2006.01) | |

(52) U.S. Cl.
CPC .......... *B60K 26/02* (2013.01); *B60H 1/2215* (2013.01); *B60K 26/04* (2013.01); *G05G 1/04* (2013.01); *B60K 2026/028* (2013.01); *B60K 2026/043* (2013.01); *B60Y 2200/252* (2013.01); *B62K 23/02* (2013.01)

(58) Field of Classification Search
CPC ........ B60K 2026/028; B60K 2026/043; B60Y 2200/252
See application file for complete search history.

(56) References Cited

U.S. PATENT DOCUMENTS

| | | | |
|---|---|---|---|
| 4,213,513 A | * | 7/1980 | Beck ...................... B60K 28/00 200/16 A |
| 5,757,165 A | | 5/1998 | Minks |
| 7,671,299 B2 | | 3/2010 | Gifford et al. |

(Continued)

*Primary Examiner* — Vicky A Johnson
(74) *Attorney, Agent, or Firm* — Merchant & Gould P.C.

(57) ABSTRACT

A snowmobile throttle control system comprises a throttle block with a throttle thumb lever pivotally connected thereto, the throttle block clamped to a snowmobile handlebar next to a right hand grip. The hand grip and/or thumb lever having electric heaters. The configuration of the throttle block and thumb lever reducing issues associated with snow and or ice buildup between the two during operation of the throttle control system by vertically and horizontally spacing respective confronting portions of each, effecting shear forces on any such ice or snow between the two, and by minimizing heat transfer between the handlebar and throttle block by reducing the contact between clamping surfaces of the throttle block engaging the handlebar thereby minimizing melting and freezing of the snow and ice at the throttle control system. The thumb lever and throttle block providing integrated securement structure for wires associated with the electric heaters.

18 Claims, 14 Drawing Sheets

(56) References Cited

U.S. PATENT DOCUMENTS

| | | |
|---|---|---|
| 9,394,859 B2 | 7/2016 | Parnofiello et al. |
| 2004/0007567 A1 | 1/2004 | Downey et al. |
| 2004/0011777 A1 | 1/2004 | Richlen |
| 2009/0194518 A1* | 8/2009 | Fujiwara .................. H05B 3/46 |
| | | 219/204 |
| 2015/0353156 A1 | 12/2015 | Hamlin et al. |
| 2020/0114999 A1 | 4/2020 | Rhodes |

* cited by examiner

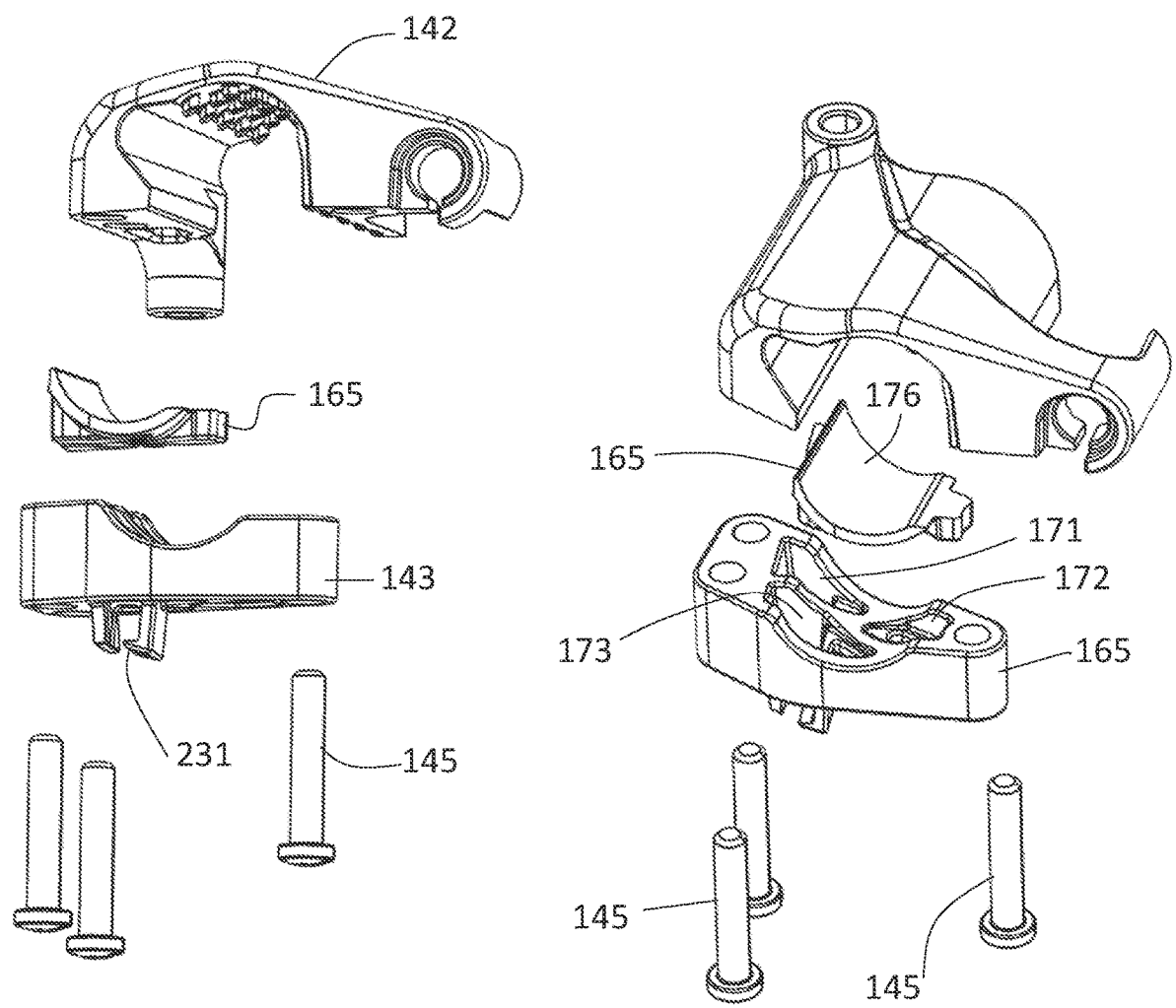

SNOWMOBILE THROTTLE CONTROL SYSTEM

This application claims priority to U.S. Provisional Application No. 63/351,647 filed Jun. 13, 2022. Said application is incorporated by reference herein.

BACKGROUND OF THE INVENTION

Snowmobiles utilize levers on the handlebars at the hand grips for controlling the throttle and for braking. Handgrips and thumb grips on snowmobiles may include electric heaters for keeping user's hands warm. Such heaters may be provided with the snowmobiles or provided in the aftermarket. Such heaters can provide a melting and refreezing of snow at the levers to the extent that the operation of the levers may be impeded, such as the throttle lever not returning to a fully closed position upon release due to buildup of ice and/or snow. Any improvements in heater implementations and lever controls that minimize lever obstructions by snow and/or ice would be well received by the snowmobile industry and snowmobilers.

SUMMARY OF THE INVENTION

Throttle control systems for a snowmobile typically comprise a throttle block that clamps onto the snowmobile handlebar and a throttle thumb lever pivotally connected to the throttle block at a pivot axis forward of the handlebar. The thumb lever extending rearwardly~" of the handlebar and the right hand grip. A throttle cable having an outer conduit and an inner wire connects to a conduit connection on the throttle block rearward of the handlebar with the inner wire extending from the conduit connection to a wire anchor at a mid portion of the thumb operable lever. When the throttle is closed, that is, a minimal engine operating level, the mid portion of the thumb operable lever confronts or seats against conduit connection on the throttle block. When the thumb lever is depressed, pushed toward the hand grip, the throttle is opened, that is increasing the operating level of the engine. As the thumb lever is depressed, a proximal portion and the mid portion of the thumb lever separates from the throttle block opening a gap and creating a snow/ice entrapment region. In a conventional snowmobile throttle control system, when the thumb lever is released, to the extent that ice and/or packed snow is between the thumb lever and the throttle block, particularly at the proximal portion and mid portion of the thumb lever and at the conduit connection, the ice and/or snow can become entrapped and compressed between confronting surfaces of the mid portion of the thumb lever and the throttle block. This can inhibit or prevent the return of the thumb lever to the fully closed position where it seats at or closely confronts the throttle block. This turn may prevent the throttle from fully closing thereby preventing the engine from returning to the minimum engine operating level. The inventor has discovered that minimizing heat transfer from the right hand grip warmer to the throttle block and minimizing the directly confronting surfaces of the throttle block by offsetting conventionally confronting surfaces at the entrapment region, minimizes the trapping of snow and/or ice between the thumb lever and throttle block thereby minimizing the occurrence of the thumb lever failing to return to the fully closed throttle position.

A feature and advantage of embodiments is that by configuring a proximal portion of the thumb lever, specifically the two arm portions extending from the pivot axis, so that they are vertically and horizontally spaced from the throttle block as the arms traverse above and below the handlebar, facilitates keeping the conventional entrapment region between the proximal and mid portions of the thumb lever and the throttle block clear of ice and/or snow.

A feature and advantage of embodiments is providing a minimal throttle block projecting portion extending toward the mid portion of the thumb lever, minimizes any snow and/or ice pinch points when the thumb lever is released from a depressed position returning to the closed throttle position.

A feature and advantage of embodiments is that the conduit end of the throttle cable may project forwardly from the conduit connection at the throttle block thereby spacing the throttle block structure at the conduit connection away from the thumb lever. Additionally, the throttle block may have upwardly and downwardly extending bosses at the pivot axis providing pronounced separation of the arm portions of the proximal portion of the thumb lever from the throttle block and handlebar. This separation eliminates directly confronting surfaces of the proximal portion of the thumb lever and the throttle block. That is, the leading edges of the thumb lever arms that traverse above and below the handlebar are not horizontally coplanar with any portion of the throttle block. This advantageously effects a shear force on snow and/or ice positioned in an entrapment region defined by a region, when viewed from above, is between the throttle block and thumb lever, rather than a compressive force that simply compresses the snow and/or ice in the entrapment region, which can than entrap same and prevent the thumb lever from returning to a fully closed position.

A feature and advantage of embodiments of the invention is a throttle block that is particularly amenable to snowmobiles with heated grips. The throttle block minimizes heat transfer from hand grip heaters through the handlebars to the throttle block by providing air gaps and air circulation pathways between the handlebar clamping interface portions of the throttle block and the handlebar reducing the amount of heat transfer. The gaps allow air to circulate between the throttle grip and the handlebar while reducing the throttle grip to handlebar contact surface area, thus reducing the heat transfer. This heat transfer reduction minimizes the melting and refreezing of snow and/or ice about the throttle control mechanism reducing the potential for obstructing the free operation of the throttle thumb lever by the snow and/or ice. The reduced heat transfer to the throttle provides the benefit of improved retention of heat at the right handgrip.

In embodiments, the reduced surface area contact and air gaps are provided by a plurality of nubs and/or ribs projecting inwardly from the throttle block surfaces toward the handlebar. The ends or peaks of the nubs and ribs contacting the handlebar surface. The spaces between the nubs and/or ribs providing the air gaps. In embodiments the upper half of the throttle block and the lower half of the throttle block both have the nubs and/or ribs. In embodiments only one of the upper and lower half have nubs and/or ribs. In embodiments, one of the upper and lower half of the throttle block has an insert at the interface with the handlebar such that the insert is retained in the half of the throttle block and the insert makes the contact with the handlebar rather than direct contact with the material of the throttle block half in that area. In embodiments the insert may be utilized to provide an enhanced clamping of the throttle block with the handlebar. In embodiments, the insert may be an elastomeric material like rubber that compresses more than the material of the throttle block half. In embodiments, the throttle block half has recesses for receiving lobes or projections on the handlebar contacting insert.

In embodiments, the throttle block is particularly amenable for snowmobiles with heated handlebar grips in that an elongate recess for receiving a cable for providing electrical power to the handgrip heaters is positioned at the clamping surface of the throttle block, the recess further providing thinned portion in the throttle block body portion that provides some minimal resiliency that facilitates the clamping action by providing a muted resilient hinge at the reduced thickness portion.

A feature and advantage of embodiments is manufacturing a throttle block out of a polymer, such as a glass filled nylon, that has a lower heat capacity and lower capability of transferring heat from the heated handgrips through the handlebars and through the throttle block. Such reduced heat compacity and lower capability of transferring heat effectively minimizes the potential for obstructing the free operation of the throttle thumb lever by the snow and/or ice melting and refreezing. A feature and advantage of embodiments is a throttle block with wire management for electric heater cables. In embodiments, a throttle block and cooperating throttle lever formed by injection molding accommodates and has securement features for electric heater cables. In embodiments, a recess is provided to capture a handgrip heater cable between the throttle block and the handlebar. In embodiments, further wire managements is provided by unitary thumb lever heater cable securement structure provided on the thumb lever and/or on the bottom side of the throttle block. In embodiments, the throttle block and/or throttle thumb lever may have channels open downwardly, the channel structure unitary with the rest of the throttle block or thumb lever, the channels for securing cables or wires, including specifically electrical wires for the heaters of the handgrips and/or thumb lever. In embodiments, the unitary channels may have an inward catch portion for retention of wires therein or a separate closure may be connected to and bridge the channels, for example a metal spring clip.

DESCRIPTION OF THE FIGURES

FIG. 19 is an exploded view of the throttle block components of the throttle assembly of FIGS. 13 and 14.

FIG. 20 is another exploded view of the throttle block components of the assembly of FIGS. 13 and 14.

DETAILED DESCRIPTION

Figure 1:
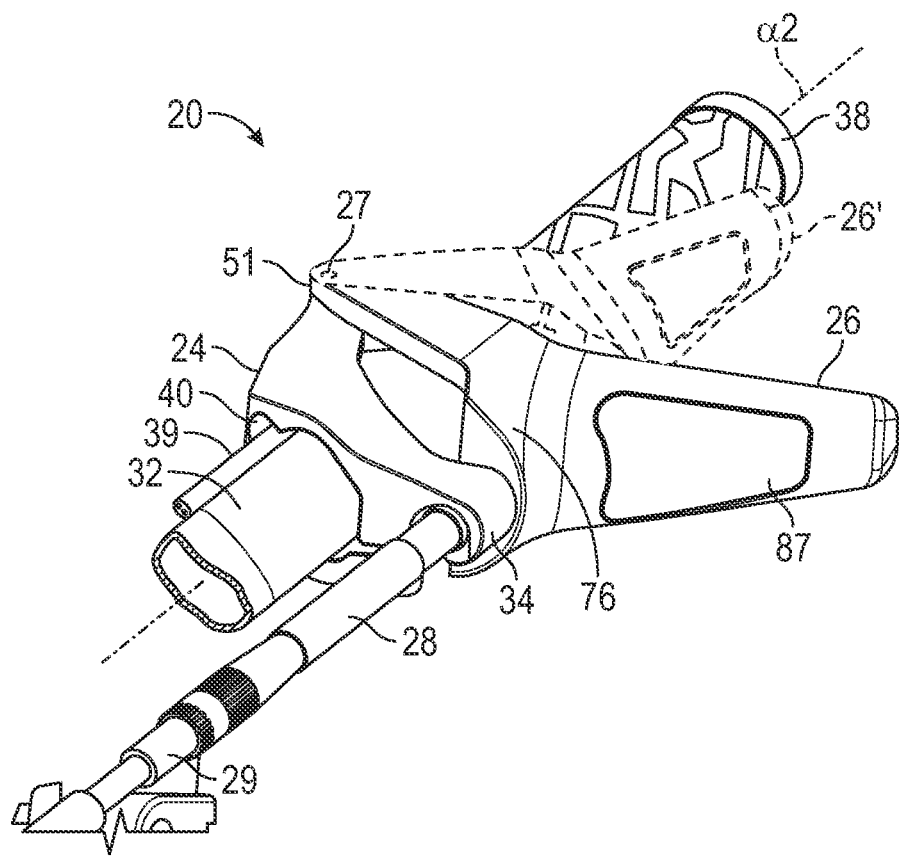
FIG. 1 is a perspective view of the right side of a snowmobile handlebar with a throttle control system mounted thereon.

Embodiments of a throttle control system provide resistance from snow and ice affecting the operation of the throttle control system and wire management features. Configuration is particularly applicable to snowmobiles with heated handgrips and/or heated throttle thumb levers. Referring to FIGS. 1-4B, in embodiments, a throttle control system 20 generally comprises a throttle block 24, a throttle thumb lever 26 pivotally connected to the throttle block at a pivot pin 27 and having a pivot axis α1, and a throttle cable 28 comprising a cable conduit 29, an inner wire 30, and an anchor 31 attached at the end of the inner wire 30. The throttle block clamped to a snowmobile handlebar 32 having an axis α2, the throttle cable conduit attached to a cable conduit connection portion 34 of the throttle block with the throttle cable inner wire 30 connecting to the thumb lever 26 at a throttle cable inner wire connection portion 36. The anchor 31 at the end of the inner wire is attached to the thumb lever at a slot 38 in the thumb lever as best depicted in FIG. 3B. A hand grip 38 is on the end of the handlebar. The hand grips may have electric hand grip heaters, not shown, with power provided by electrical cable 39 that may be accommodated by the throttle block by way of recess 40.

Figure 17:
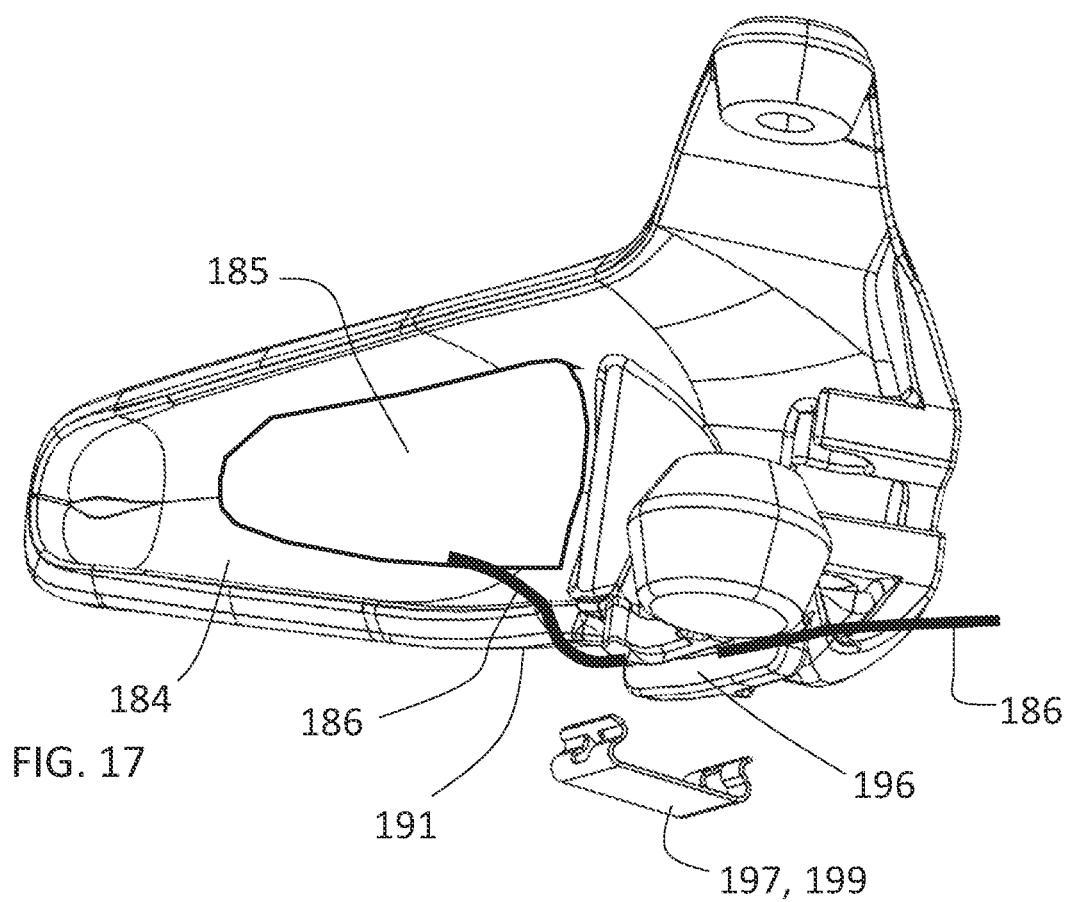
FIG. 17 is a perspective view of throttle thumb lever of the throttle block assembly of FIGS. 13-14.
Figure 18:
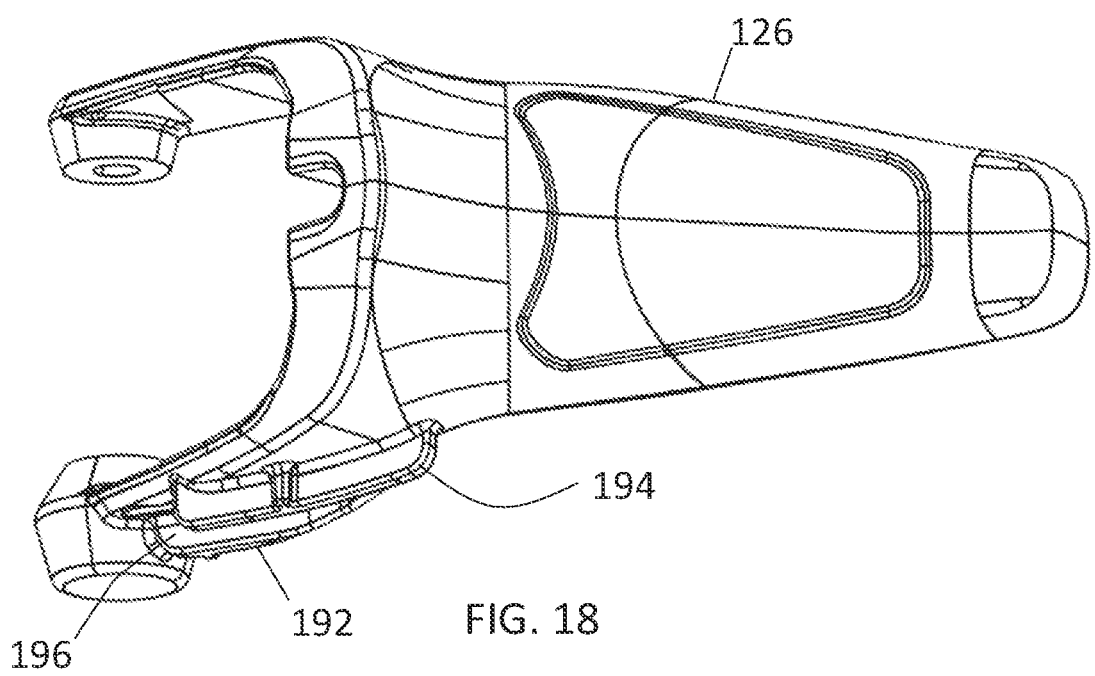
FIG. 18 is another perspective view of the throttle thumb lever of FIG. 17.

The thumb lever 26 is connected to the snowmobile engine by way of the throttle cable 28 and controls the speed or level of operation of the snowmobile engine. As shown in FIGS. 1, 2, 3A, 3B and 4A the thumb lever is in an undepressed state where the throttle is "closed" or at a minimum operating level in which the snowmobile is at idle and not moving. Depressing the thumb lever with a user's thumb as shown in FIGS. 1, to the depressed position of thumb lever 26', see dashed line, and in FIG. 4B, pulls the inner wire 30 in the cable conduit and actuates or opens up the throttle to increase the level or speed of operation of the snowmobile engine as is well known to those skilled in the art. The thumb lever 26 may also have an electric heater element 185 positioned as shown in FIG. 17. Wiring for the thumb lever is illustrated in shown in FIGS. 14 and 17.

Figure 3A:
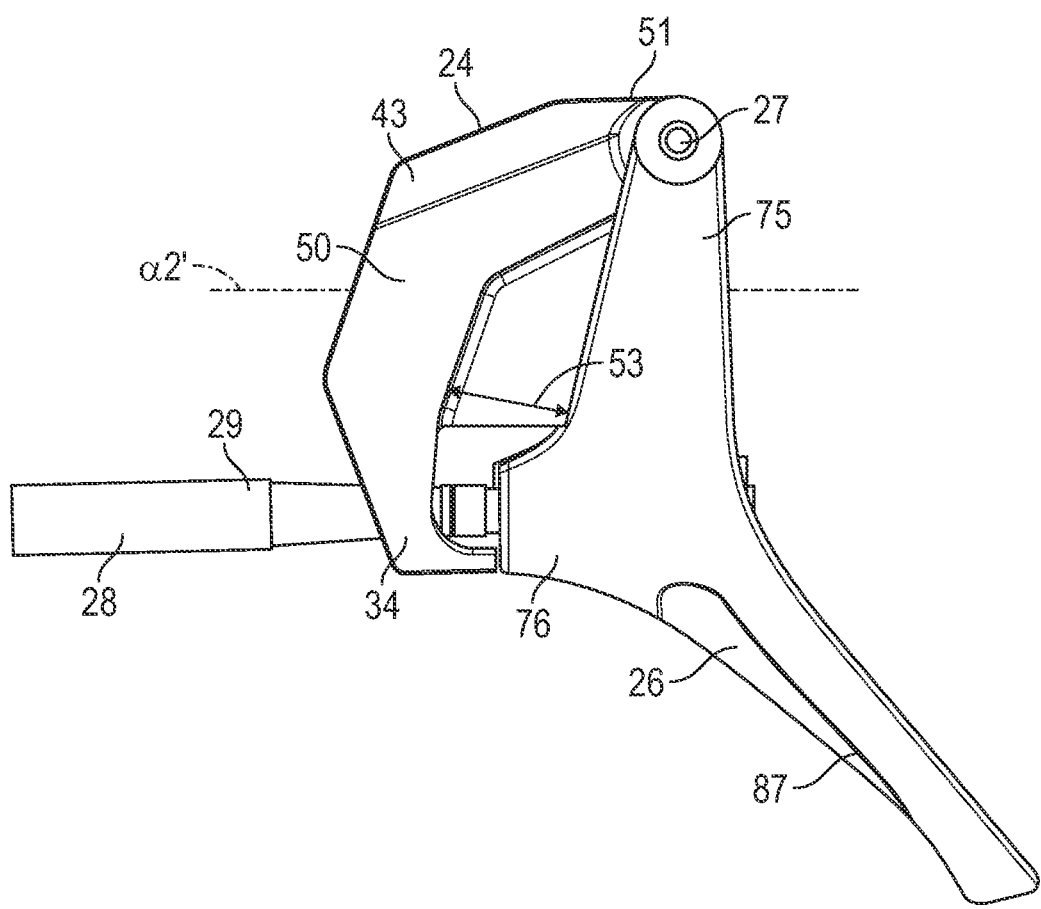
FIG. 3A is a top plan view of the throttle control system of FIG. 2.
Figure 3B:
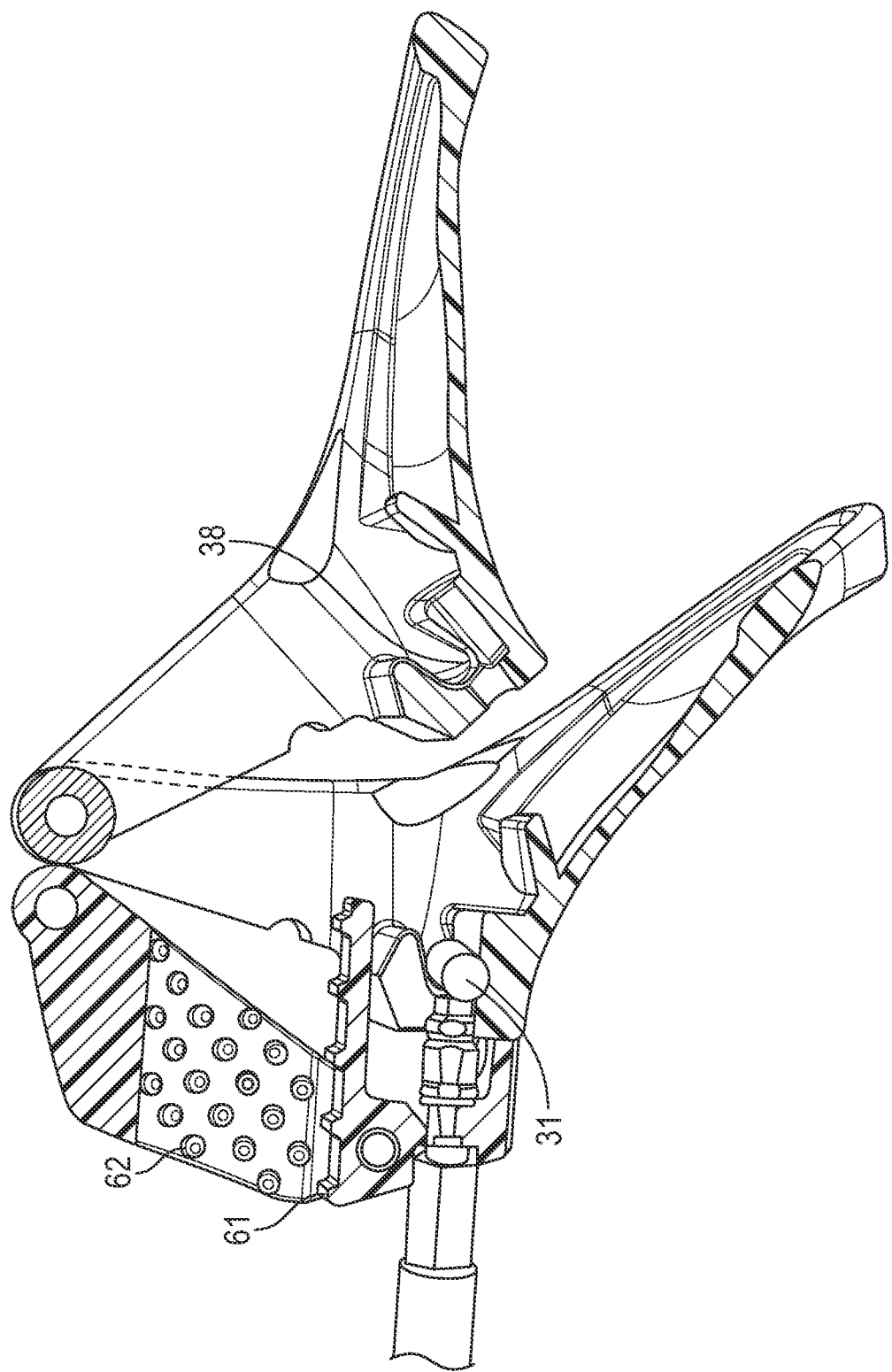
FIG. 3B is a cross-sectional view of the throttle control system of FIG. 3A taken at a plane illustrating the connection of the throttle cable and showing the throttle thumb lever in two positions including a throttle closed position.
Figure 3C:
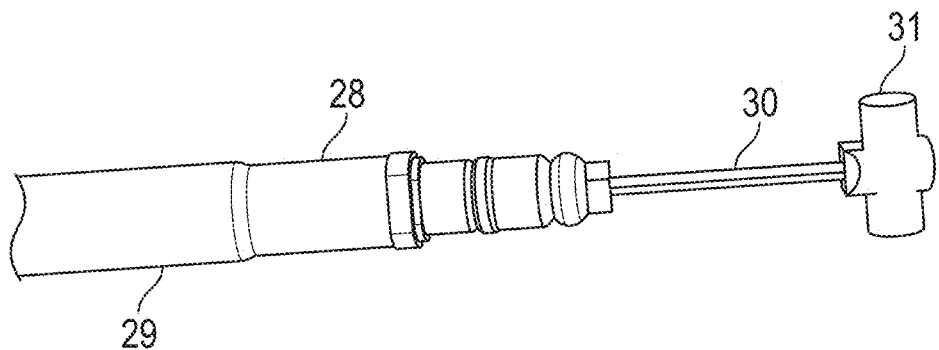
FIG. 3C is a perspective view of the throttle lever connecting end portion of the throttle cable.

The throttle block 24 may be comprised of a pair of cooperating throttle block halves or portions 42, 43, one configured as main body portion 42 and one configured as a clamping portion 43. The throttle block portions clamp onto the handlebar and may be split horizontally, see FIGS. 6-12. As illustrated, the portions may not be equal geometric halves but do form a clamp for containing the handlebar and are secured together and clamped to the handlebar by screws 45, 46. The respective throttle block portions define a handlebar opening that when clamped about the handlebar has an axis $\alpha 2'$ that is coincident with a handlebar axis $\alpha 2$. The upper portion 42 defines a wall 44 having an reduced thickness arcuate portion 48 with a generally constant wall thickness that follows the curvature of the handlebar with has the axis $\alpha 2'$, and a raised or projecting portion 50 that extends from the pivot pin receiving portion 51 of the throttle block 24 to the cable conduit connection portion 34 on the opposing corner of the throttle block 24. The raised portion may be raised relative to the arcuate portion 48 and as illustrated in FIG. 3 and, when viewed from above, has a C-shape. The raised portion 50 providing structural support for the throttle cable conduit connection portion 34. Notably the raised portion 50 is horizontally spaced from the thumb lever 26, even in the non-depressed state, thereby minimizing the opportunity of snow and/or ice to get captured between the raised portion 50 and the thumb lever 26. As best illustrated in FIG. 3A, the horizontal gap 53, in embodiments may be at least ⅜ of an inch. In embodiments the gap may be at least ½ of an inch. The raised portion 50 is also vertically spaced from an upper arm 56 of the thumb lever and except at the pivot pin receiving region 51, the upper arm does not overlap the raised portion 50, when viewed from above. As shown in FIGS. 3-4B the throttle block has a forward portion 57, forward of the handlebar when mounted thereon, and a rearward portion 58 that is rearward of the handlebar when mounted thereon. The pivot pin receiving region 51 with the pivot pin 27 therein is in the forward portion, the throttle cable conduit connection portion 34 is positioned in the rearward portion. The rearward portion defines an elongate projection 59 that extends towards the thumb lever and has an axis $\alpha 3$ that is generally aligned with an axis $\alpha 4$ of the throttle cable 28. The elongate projection includes a stop surface 60. The stop surface 60 confronts or engages the throttle cable inner wire connection portion 36 of the throttle thumb lever 26.

Figure 2:
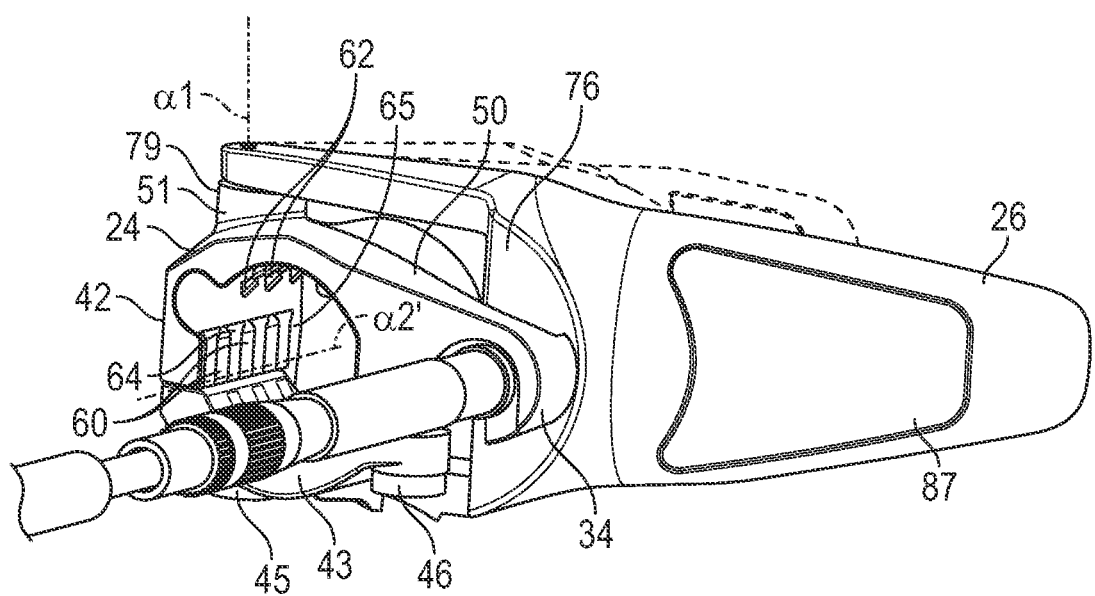
FIG. 2 is a perspective view of throttle control system of FIG. 1 without the handlebar.

Referring to FIGS. 2, the throttle block may have a plurality of standoffs configures as ribs 61 and/or nubs 62 that are unitary with one of the throttle block halves 42, 43. When the hand grip is heated, the handlebar is also heated and these ribs 61 and/or nubs 62 minimize the contact area of the throttle block with the handlebar 32 thereby reducing the heat transfer from the heated handlebar 32 to the throttle block 24. Such heating is believed to cause snow and ice melting and refreezing in the region of the throttle block and thumb lever that may increase the throttle control issues, for example, precluding the thumb lever from returning to its non depressed or normal, closed throttle position. Reduction of the heating is believed to minimize the melting and refreezing issues. Additionally, the ribs 61 and nubs 62 define air pathways 64 allow air to circulate between the handlebars and throttle block, again reducing heat transfer from the heated handlebar to the throttle block 24. The ribs and/or standoffs may extend around the entire handlebar contact region 65 of the throttle block.

Figure 7:
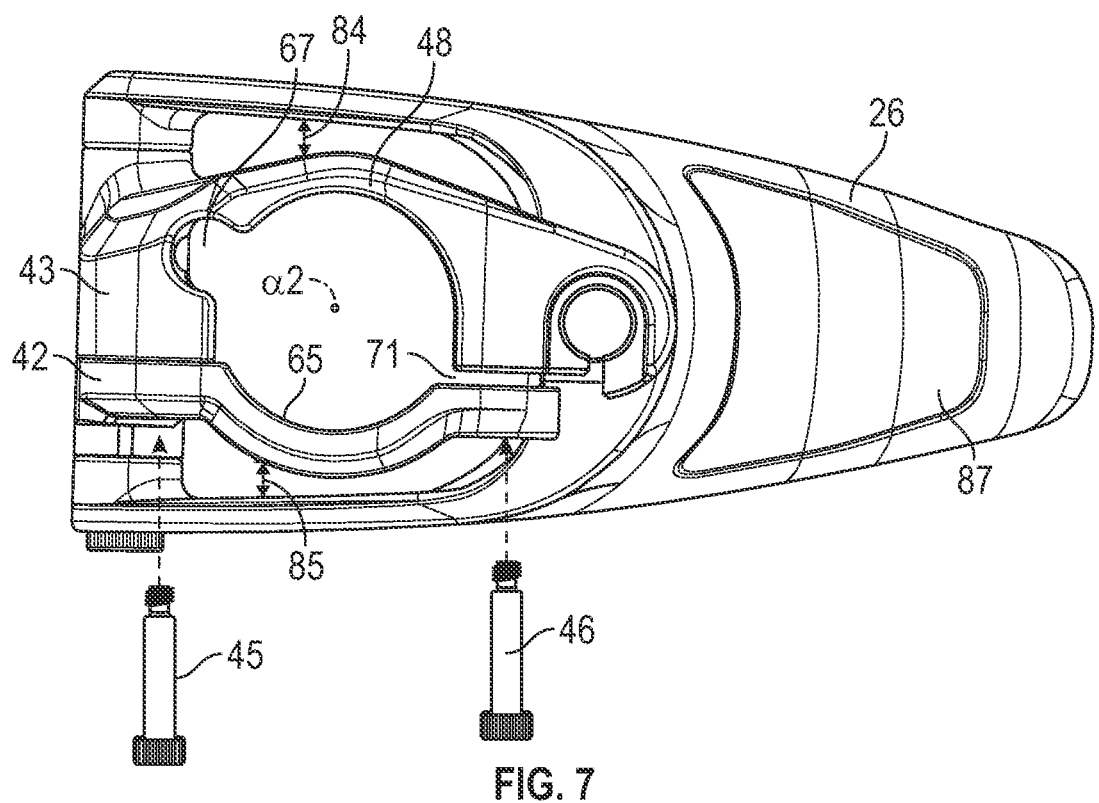
FIG. 7 is an elevational view of the throttle block and throttle thumb lever of FIGS. 4-6.
Figure 8A:
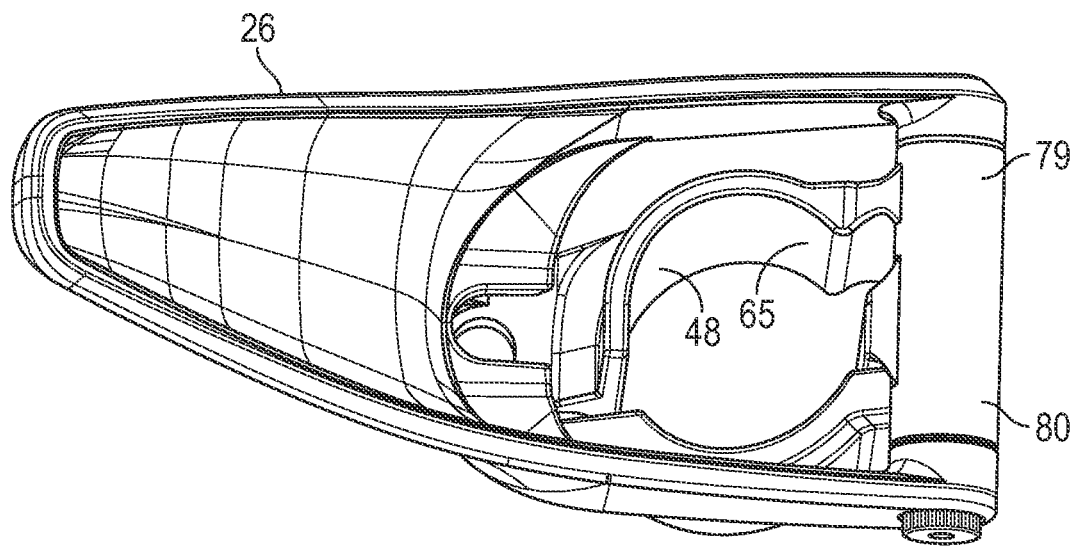
FIG. 8A is a perspective view of an embodiment of the throttle block and throttle thumb lever of FIGS. 4-7.
Figure 8B:
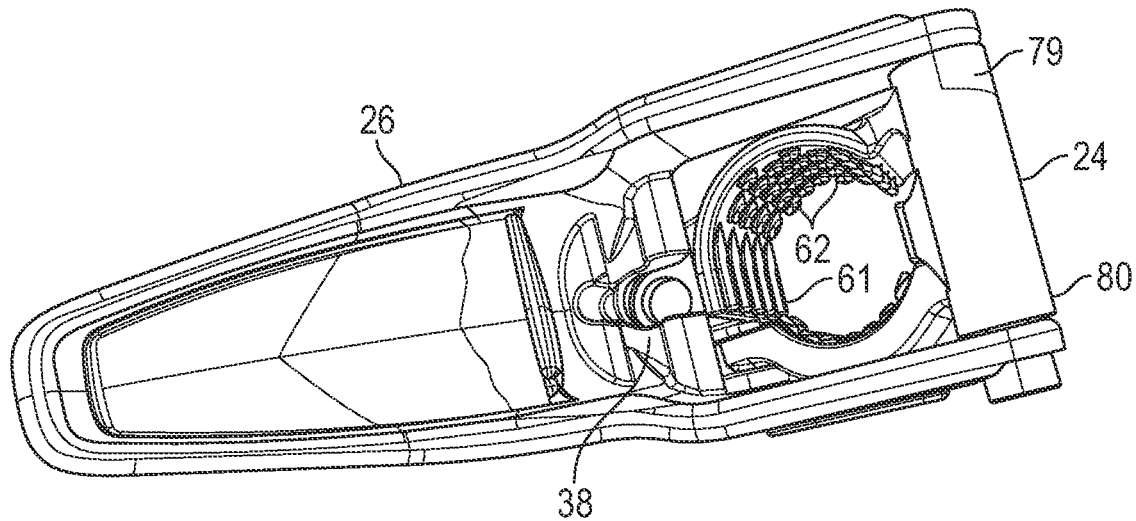
FIG. 8B is a perspective view of an embodiment of the throttle block assembly illustrating ribs and standoffs.
Figure 9:
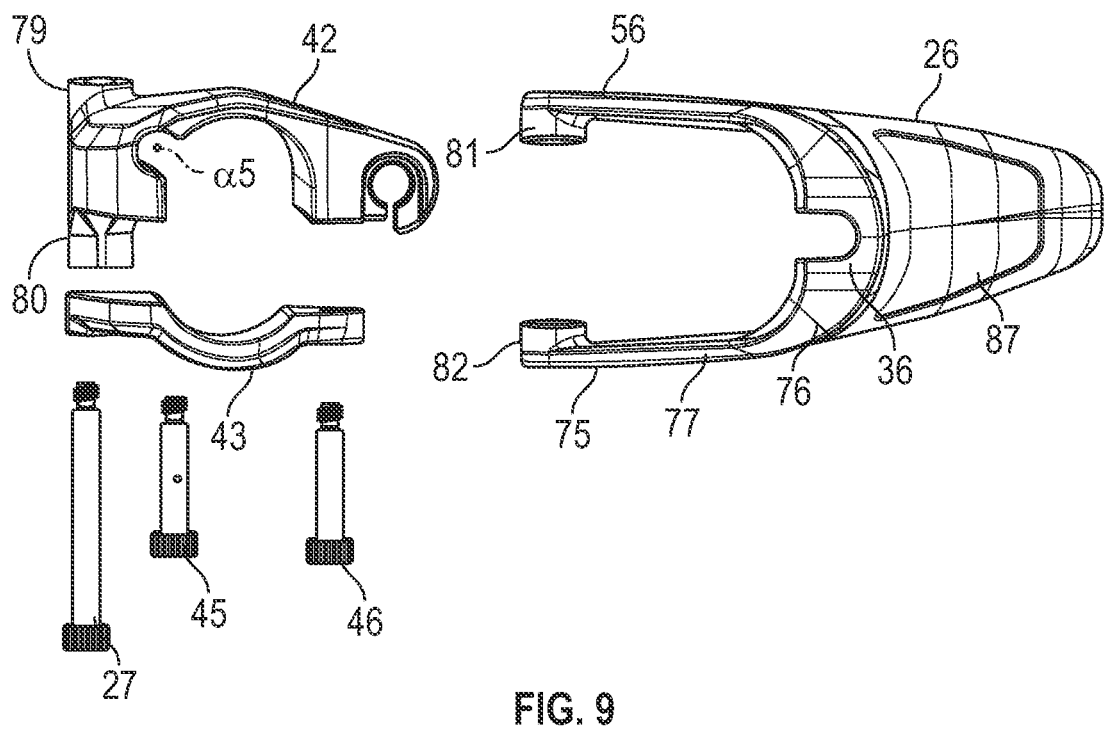
FIG. 9 is an exploded view of the throttle block and throttle thumb lever of FIGS. 4-8
Figure 10:
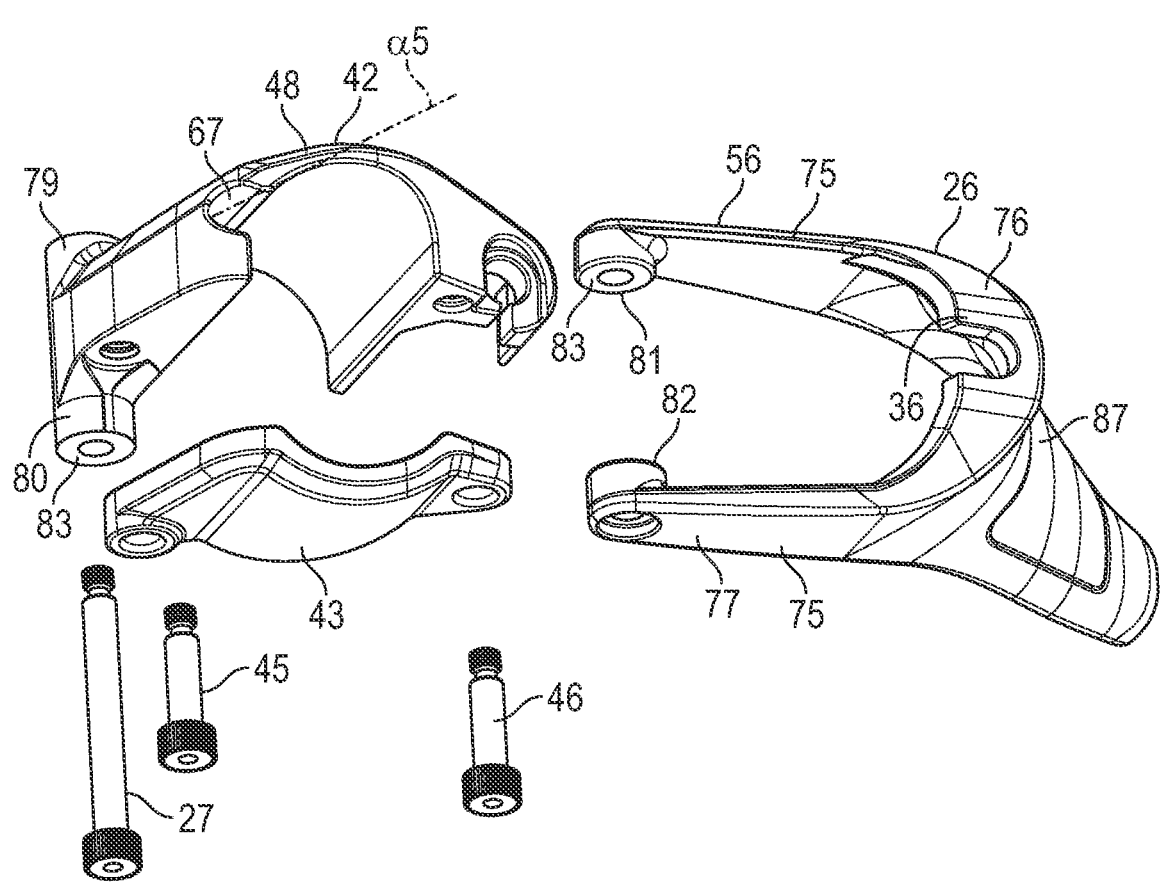
FIG. 10 is another exploded view of the throttle block and throttle thumb lever of FIGS. 4-8.
Figure 11:
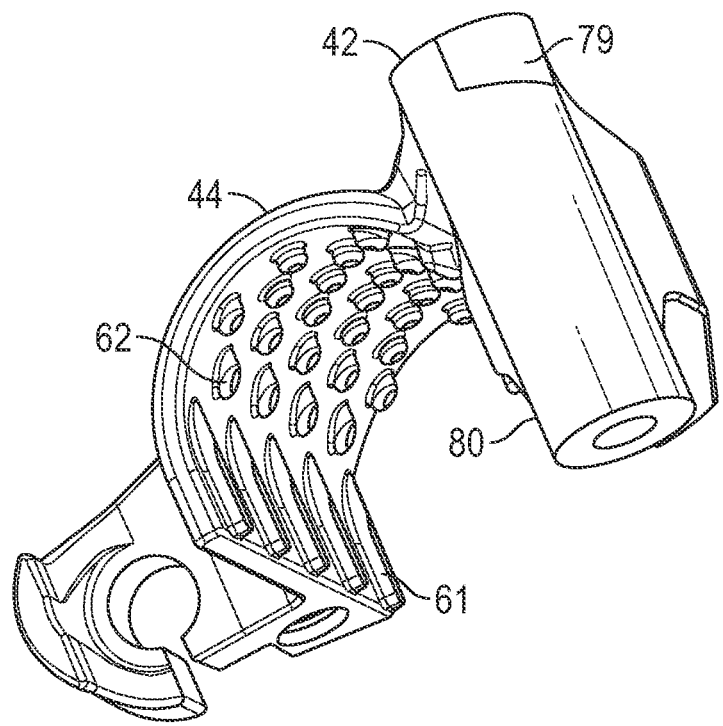
FIG. 11 is a perspective view of the throttle block with the ribs and standoffs.
Figure 12:
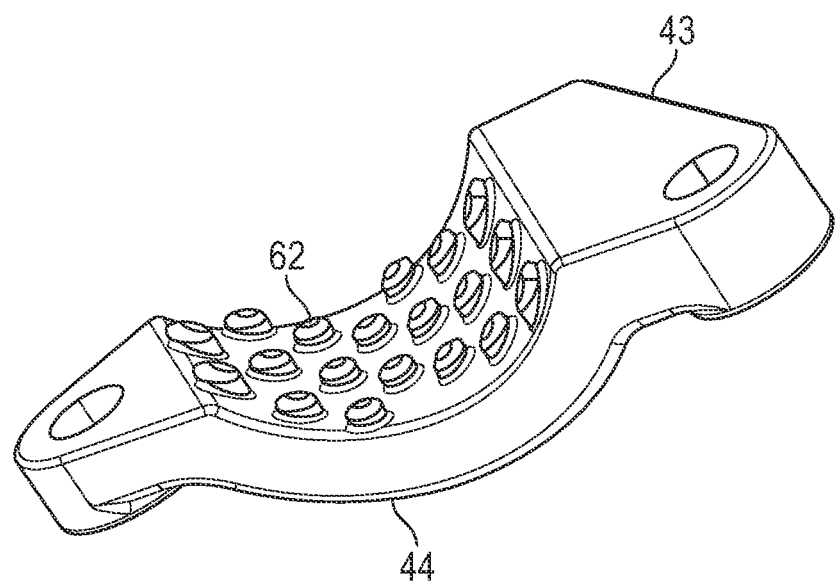
FIG. 12 is a perspective view of a cooperating clamp portion to the throttle block of FIG. 11.
Figure 13:
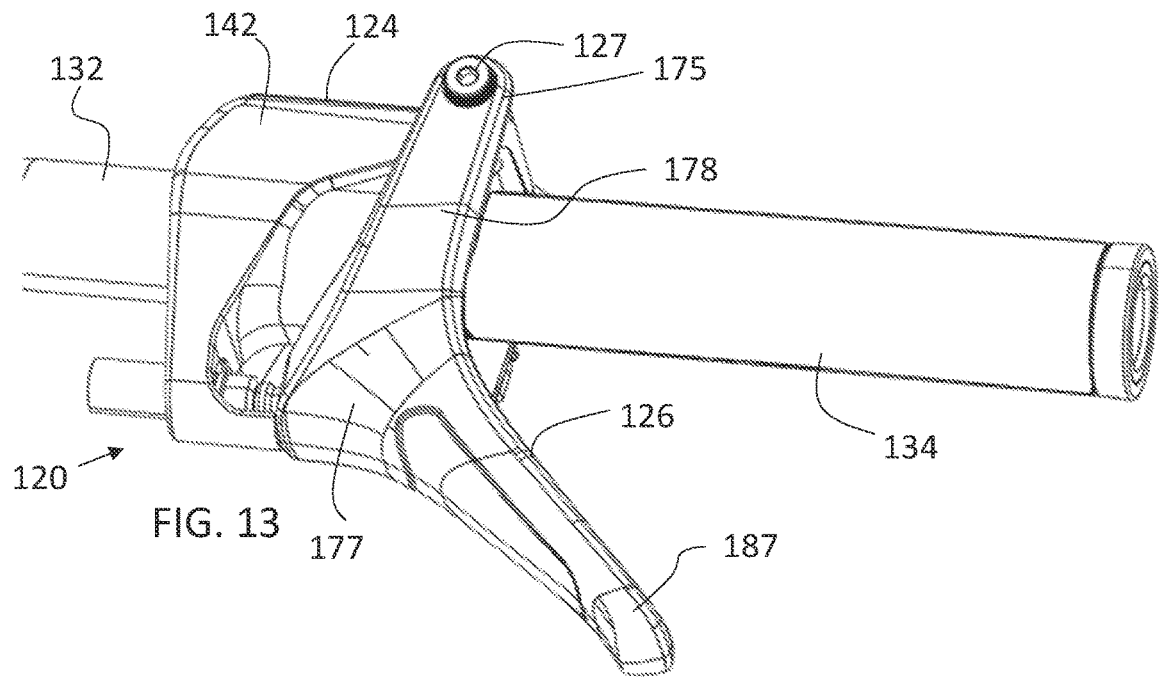
FIG. 13 is a top perspective view of another embodiment of a throttle block and thumb lever assembly attached to a handlebar.

As best shown in FIGS. 6-10, the handlebar contact region 65 of the throttle block 24 includes the recess 40 with an axis $\alpha 5$ that runs parallel to the handlebar opening axis $\alpha 2$ and extends the full length of the throttle block in the direction of said handlebar axis. The recess providing a pathway for a cable, such as a cable for a hand grip heater for the right hand grip, the heater is not shown. Referring specifically to FIG. 7, the two throttle block halves 42, 43 cooperate to clamp onto the handlebar. After insertion of the screws and before tightening the screws 45, 46, a gap 71 is provided that allows the compressive and circumferential tightening on and about the handlebar 32.

Figure 4A:
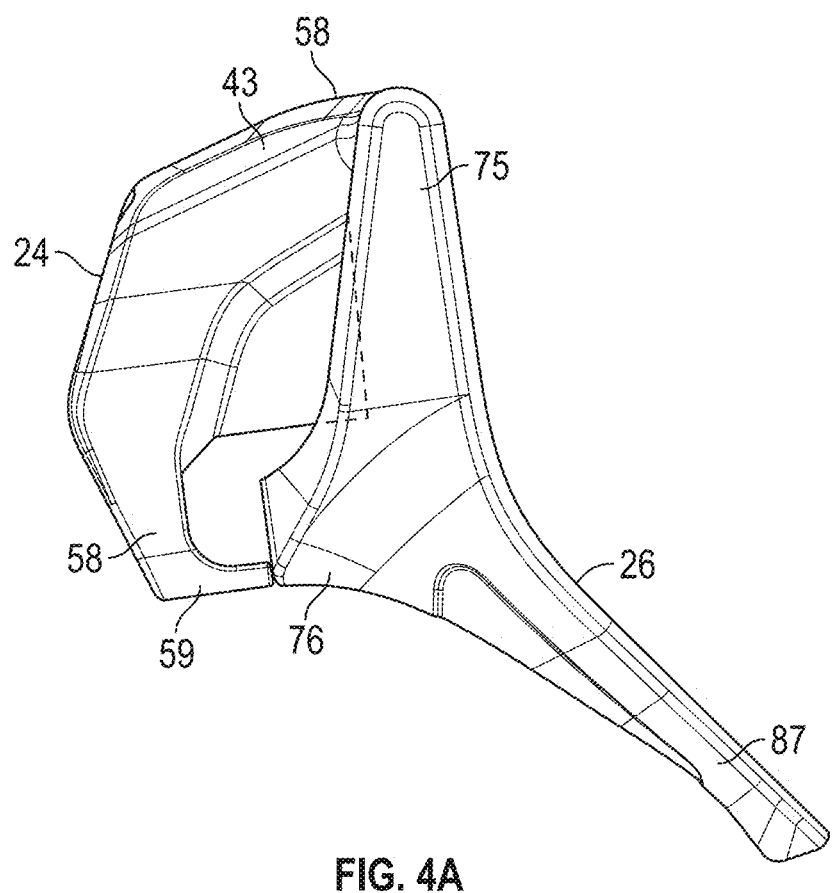
FIG. 4A is a top plan view of a throttle block with a throttle thumb lever with the thumb lever in the undepressed or closed throttle position.
Figure 4B:
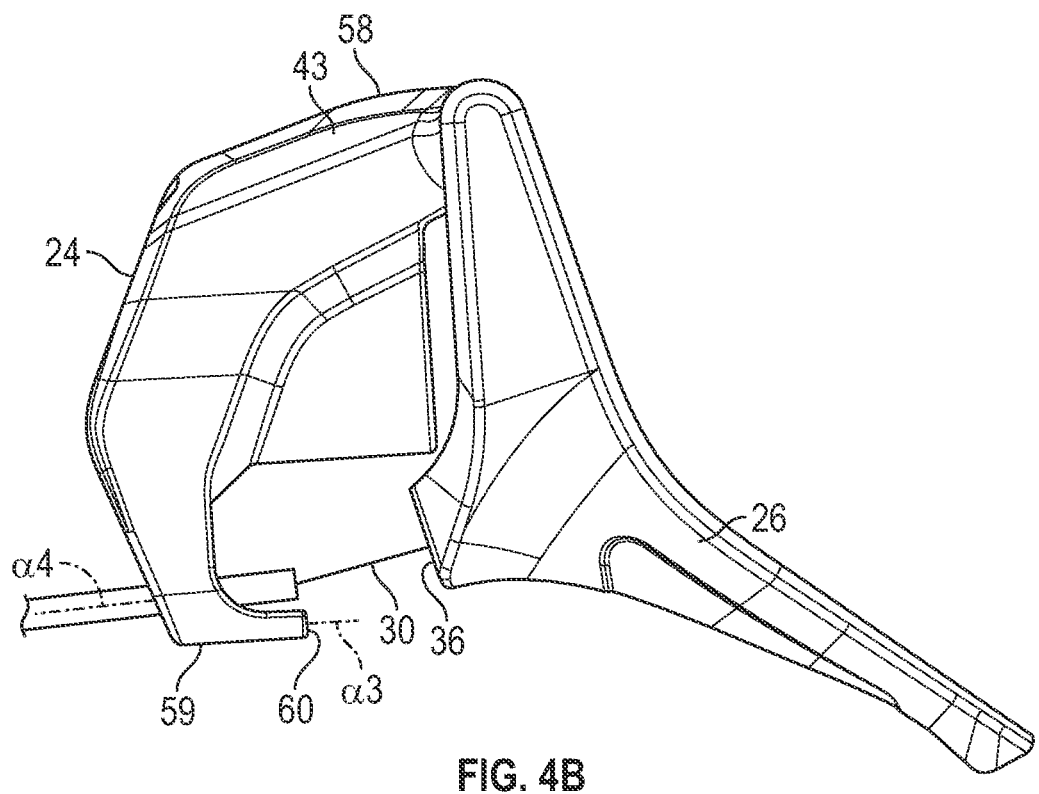
FIG. 4B is a top plan view of the throttle block with thumb lever of FIG. 4A with the thumb lever depressed.
Figure 5:
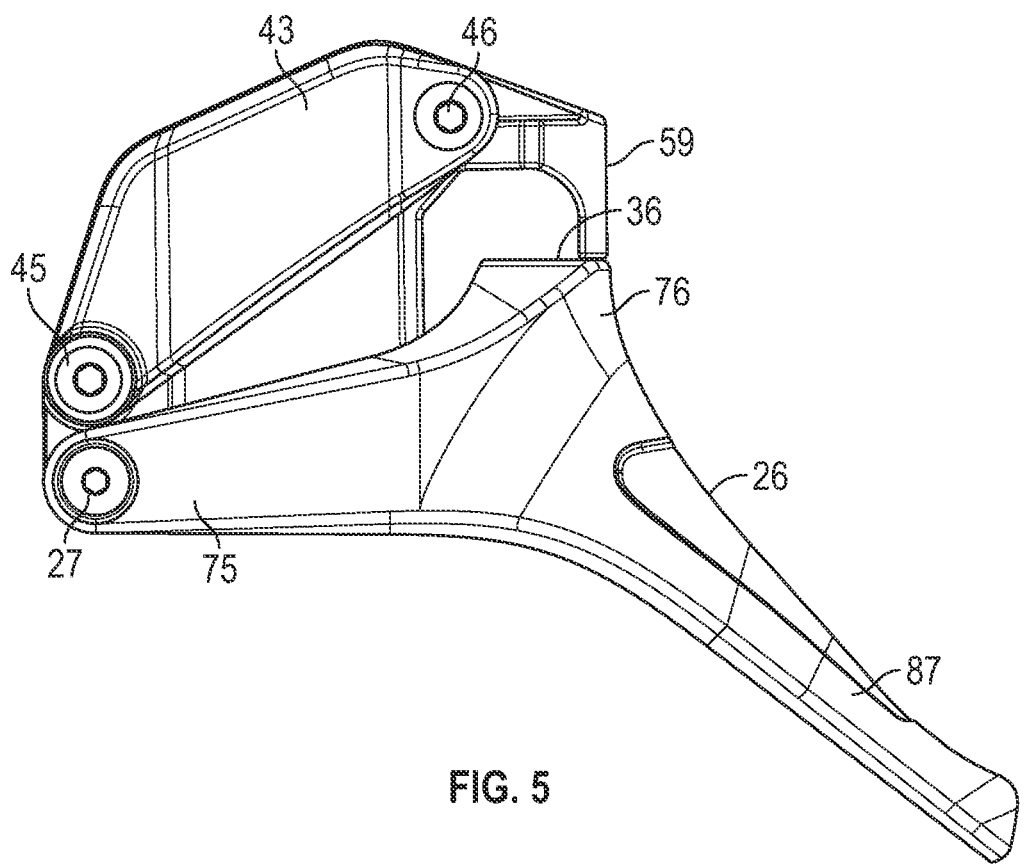
FIG. 5 is a bottom plan view of the throttle block and throttle thumb lever of FIG. 4.
Figure 6:
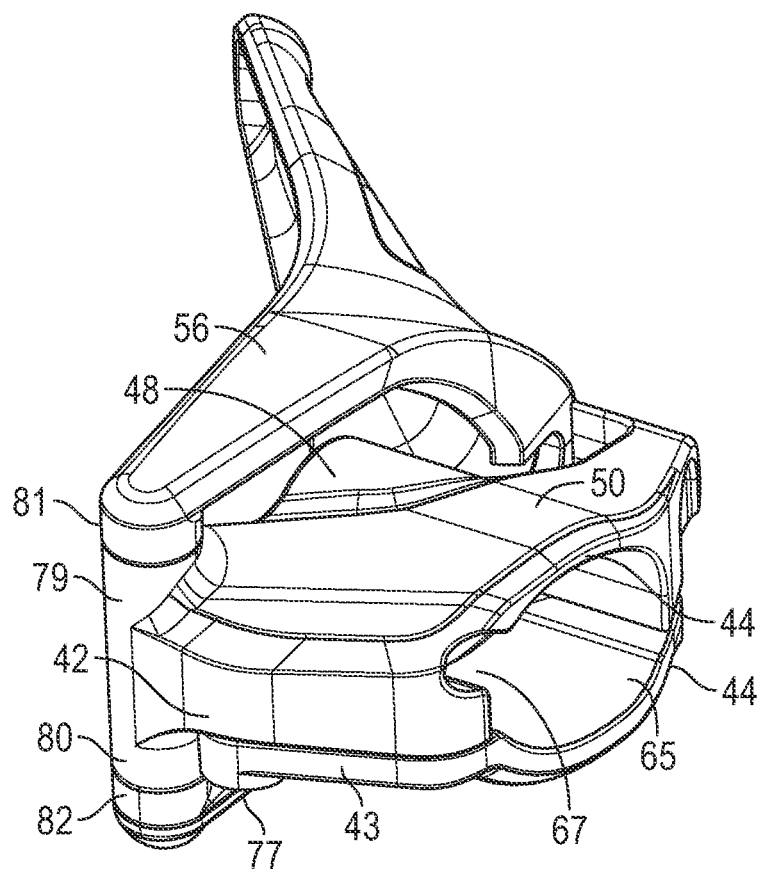
FIG. 6 is a perspective view of the throttle block with a throttle thumb lever of FIGS. 4 and 5.

Referring to FIGS. 4A-12, the throttle thumb lever 26 has a proximal portion 75 extending from the pivot pin 27 to a mid portion 76. The mid portion including the throttle cable wire connection portion 36. The proximal portion configured as two thumb lever arms, the upper arm 56 and a lower arm 77, that extend from the pivot pin to cross over and cross under respectively the handlebar when the throttle block and thumb lever are attached to the handlebar 32. Significantly the thumb lever arms 56, 77 are separated from the throttle block 24 except at the two projecting bosses 79, 80 where the arms pivotally connect to the pivot pin 27. The thumb lever 26 may have cooperating bosses 81, 82 projecting inwardly from the lever arms 56, 77. The cooperating surfaces 83 of the bosses being bearing surfaces. When viewed from above, as best illustrated in FIGS. 4A and 4B, the thumb lever may barely overlap the throttle block except at the pivot pin receiving portion 51 and the region outlined by the dashed line of FIG. 4A. When the thumb lever is depressed, as shown in FIG. 4B, the thumb lever does not overlap the portion of the throttle block that engages the handlebar. As is illustrated best by FIG. 7, significant vertical gaps 84, 85 are present when viewed from the side. These vertical gaps do not change when the thumb lever is depressed. The gaps at the portion of the throttle block that engages the handlebar can be, for example, ⅛ inch or more, in embodiments. In embodiments greater than 1/16 inch. The mid portion 76 of the thumb lever 36 connects to the distal portion 87 configured as a thumb gripping portion.

Figure 14:
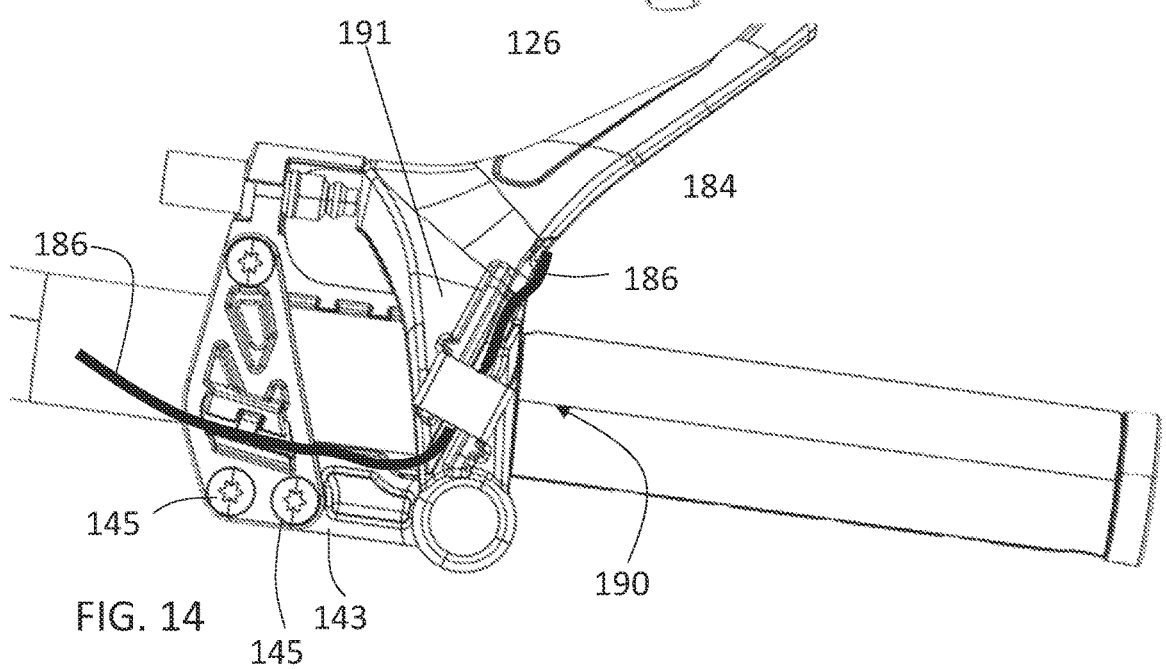
FIG. 14 is a bottom plan view of the throttle block and thumb lever assembly of FIG. 13.
Figure 15:
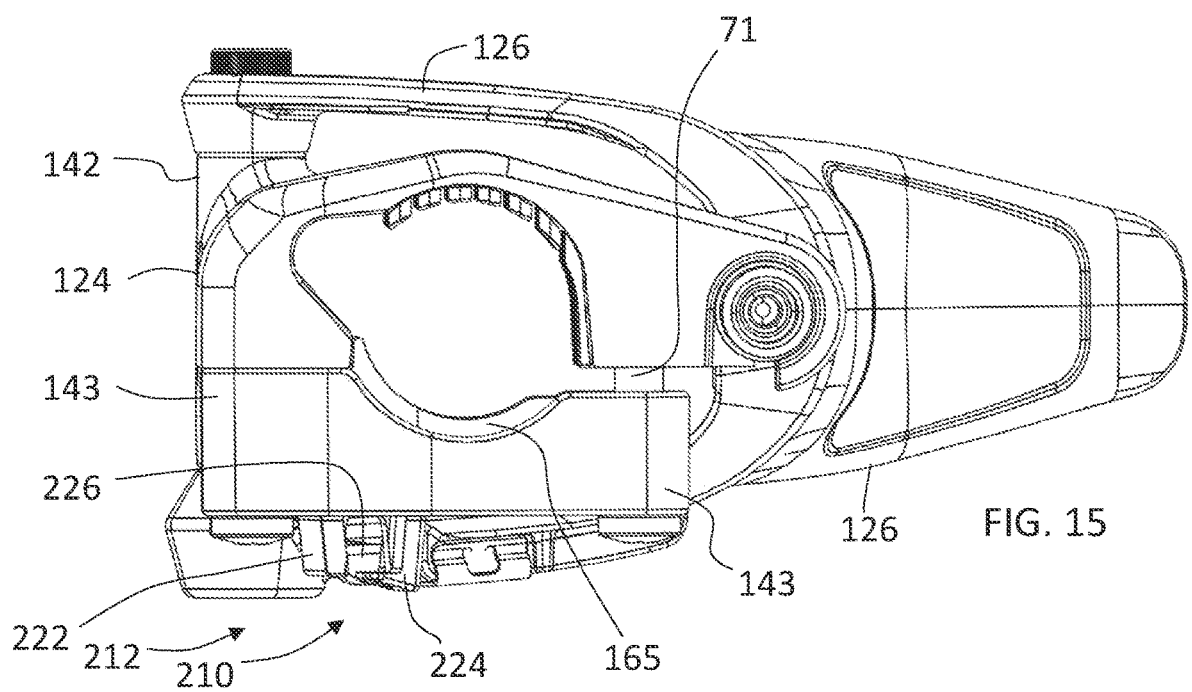
FIG. 15 is elevational view of the throttle block and thumb lever assembly of FIG. 13 at the throttle block side.
Figure 21:
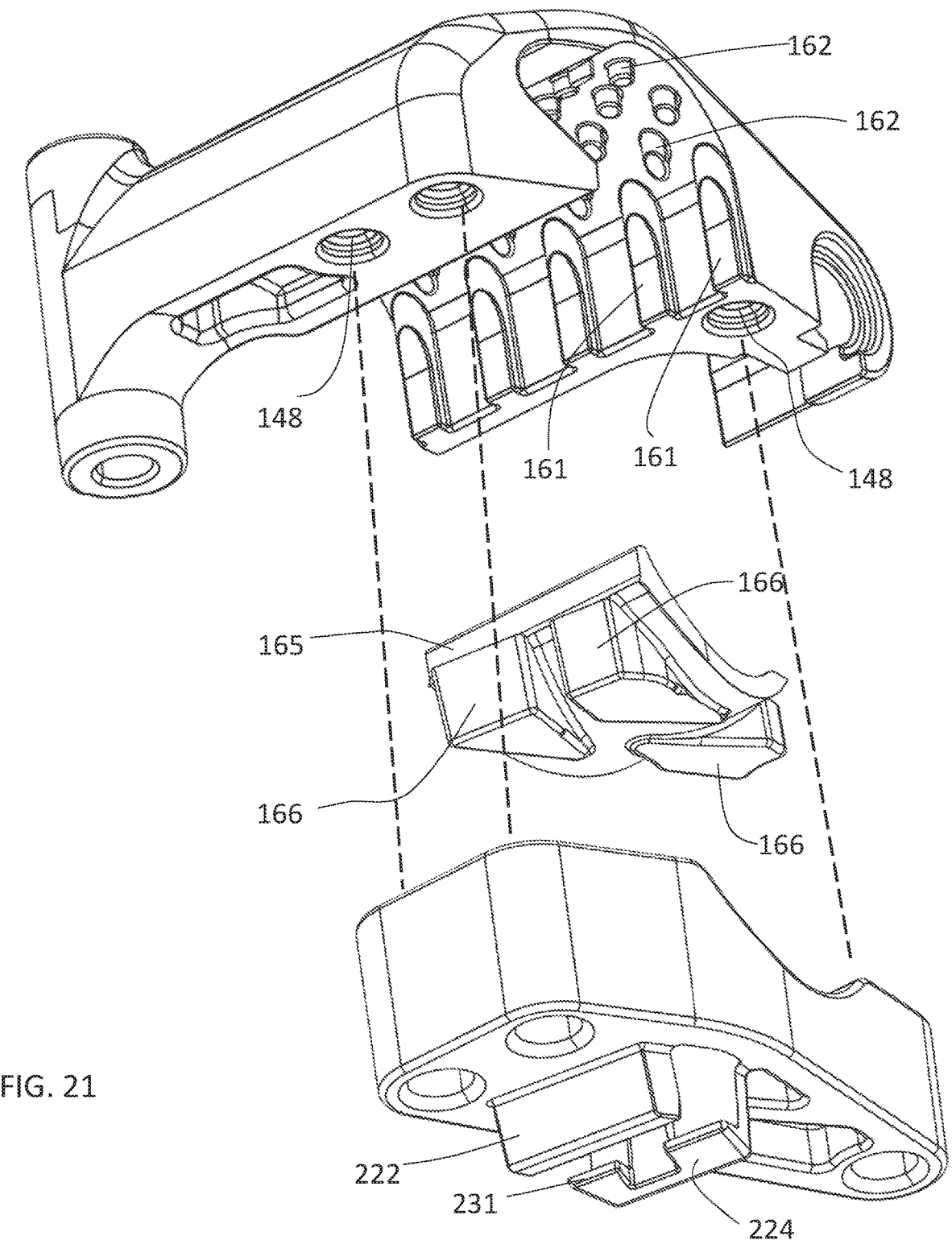
FIG. 21 is another exploded view of the components of the throttle block components of the assembly of FIGS. 13 and 14.

Referring to FIGS. 13-21, an embodiment of a throttle control system 120 is depicted which has throttle block 124 and a thumb lever 126 pivotally connected to the throttle block at pivot pin 127 and mounted to the handlebar 132 adjacent to handgrip 134. The throttle block having an upper half 142 and a lower half 143 secured together with three screws 145 that may be received by threaded metal inserts 148 embedded in the upper half 142 of the throttle block. As best shown in FIGS. 14, 20, and 21 the lower half 143 having a rounded triangular shape when viewed from above.

Continuing to refer to FIGS. 13-21, in an embodiment, the upper half 142 of the throttle block has standoffs configured as ribs 161 and nubs 162 and the lower half 143 does not. The lower half 143 having an insert 165 with lobes or projections 166 on one side and a handlebar engaging surface 167 on the opposite side with a partial cylindrical shape corresponding to the shape of the handlebar. The insert 165 is received into recesses 171, 172, 173 of the lower half 143 and presents the insert 165 for engagement with the handlebar opposite the ribs and nubs of the upper half 142 of the throttle block 124. The insert 165 may be formed of an elastomeric material that compresses and facilitates a tight and secure grip of the throttle block on the handlebar. In embodiments the insert may be formed of other materials that provide desired characteristics for interfacing with the handlebar and may be formed of polymers, metals, composites, or other materials or combination of materials. The insert may provide the entirety of the handlebar contact with the throttle block half that has the insert, in this case the lower half. In embodiments, the insert provides a contact region 176 extends circumferentially about the handlebar when engaged from about 60 degrees to about 185 degrees. In embodiments, the insert provides a contact region 176 extends circumferentially about the handlebar when engaged from about 80 degrees to about 130 degrees. In embodiments, the insert provides a contact region 176 extends circumferentially about the handlebar when engaged from about 80 degrees to about 105 degrees. In embodiments, both throttle block halves may utilize respective inserts for engagement of the handlebar. In embodiments, the inserts may have nubs, ribs, or other projections for engaging the handlebar. Similar to the embodiment of FIGS. 1-4A, the thumb lever has a proximal portion 175, a mid portion 177, a traversing portion 178, and a distal portion 187. See FIG. 13.

Referring in particular to FIGS. 14 and 17, the thumb lever 126 may have an electric heater 185 disposed on the forward concave portion 184 with electrical wires 186 extending therefrom. For accommodating the electrical wires 186, the thumb lever may have wire management structure 190 on the bottom side 191 of the lower throttle portion 143. The wire management structure may be configured as a channel 192 with a pair of downwardly projecting wall portions 193, 195 extending therefrom and defining a slot 196. Means 197 may be provided for capturing the wire cable therein such as channel cover 199 which may be configured as a U-shaped metal spring clip that press fits onto the pair of wall portions. The wire management structure is advantageously formed as a unitary with the thumb lever body and is positioned inconspicuously at the bottom side where even if it is not used, such as where there is no thumb lever heater, it is not readily visible and is not projecting into any user regions where it might be an annoyance.

Figure 16:
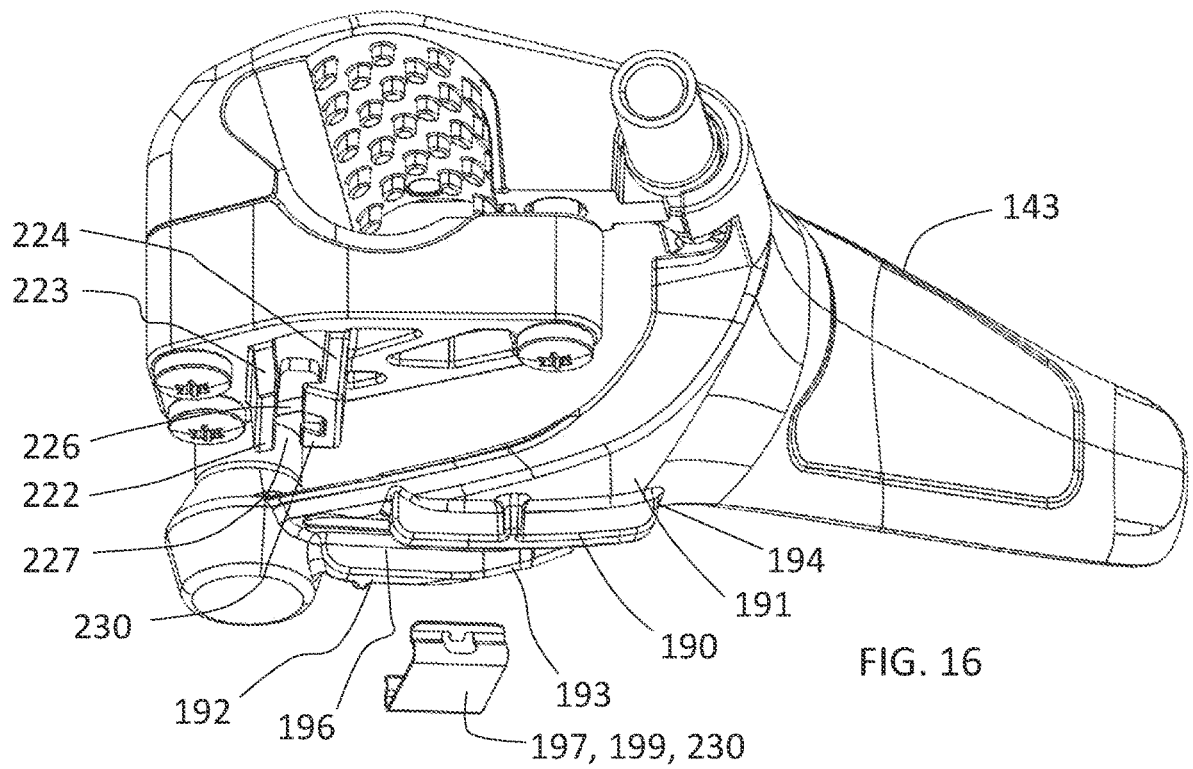
FIG. 16, is a perspective view of the throttle block and thumb lever assembly of FIG. 15 looking upwardly.

Referring in particular to FIGS. 14, 16, and 19, in an embodiment the lower throttle block 143 half may have also have wire management structure 210 on the bottom side 212 of the throttle block half. The wire management structure may be configured as a channel 222 with a pair of downwardly projecting wall portions 223, 224 extending therefrom and defining a slot 226. Means 230 may be provided for capturing a wire cable therein, for example, the thumb lever heater wire. The means 230 may be, for example, a "beak" shaped projection 231 on one of the projecting wall portions 223, 224. The wall portion may be provided with some resilience from the throttle block material allowing the wall portion 223 to deflect to allow insertion. In embodiments the opening 227 is wide enough for the wire insertion. The means 230 may also be a cover 199 to bridge the two wall portions as described in association with the thumb lever 126.

In embodiments, the throttle block may be formed of a polymer, for example a glass filled nylon. In embodiments the throttle block may be formed of aluminum or steel or other materials. In embodiments, the thumb lever may also be formed of a polymer such as a glass filled nylon, or a carbon fiber matrix with a polymer resin, or formed of aluminum, or steel. As described above, each of the throttle block halves and thumb lever may be formed, for example, by injection molding. Other known manufacturing methods such as machining, casting, printing, powder metal compacting, metal injection molding may also be used in embodiments. The throttle block may be formed as a single unitary component rather than two clamping halves. In such a case the gap 71 may be increased in dimension and/or the block may be attached to the handlebar before the right handgrip is installed. The single component throttle block may still utilize an insert for enhancing the clamping action on the handlebar.

When "vertical" or "horizontal" or other forms of those words are used herein, such usage does not require precise vertical or horizontal alignment. "Vertical" meaning only generally more vertical than horizontal for instance; "horizontal" meaning more horizontal than vertical, for instance. When "portion" is used herein, such may refer a distinct member that is separable from other adjoining members, or it may refer to a region or section of a component that is unitary or integral with the rest of the component.

All the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive. The following U.S. patents and U.S. patent applications are incorporated herein for all purposes: 2004/0007567; 2004/0011777; 2009//0194518; 2015/0353156; 2020/0114999; U.S. Pat. Nos. 7,671,299; 5,757,165; and 9,394,859.

Each feature disclosed in this specification (including references incorporated by reference, any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A throttle control system for a snowmobile comprising:
   a throttle block having an upper portion and a lower portion defining a generally cylindrical handlebar opening having an axis, for clamping to a snowmobile handlebar at a right hand grip, the throttle block having a forward portion that is positioned forward of the handlebar and a rearward portion that extends rearwardly from the handlebar when the throttle block is mounted on the handlebar, the forward portion having a vertical pivot pin therein, the rearward portion having a throttle cable conduit connection portion; and a thumb lever having a proximal portion with a pair of lever arms, an upper lever arm and a lower lever arm, each with a forwardmost end, the thumb lever further having a mid portion with a throttle cable wire connection portion, and a distal portion with a thumb gripping portion, the thumb lever pivotally attached to the throttle block with each of the forwardmost ends of the lever arms captured by the vertical pivot pin in the throttle block, wherein when thumb lever and throttle block are mounted on the handlebar, the thumb lever has an undepressed position where the midportion is confronting the throttle cable conduit connection portion of the throttle block, the thumb lever depressible to a position away from the undepressed position;

wherein each of the pair of lever arms have a traversing portion that extends across the handlebar when the system is attached thereto, and wherein when viewed from the side in a direction along the axis of the cylindrical handlebar opening, the traversing portion of the upper lever arm is vertically spaced from the entirety of the throttle block providing a vertical clearance between the throttle block and the traversing portion of the upper lever arm;

wherein the rearward portion of the throttle block has a stop portion that projects towards the mid portion of the thumb lever, the stop portion positioned rearwardly from the throttle cable connection portion of the rearward portion, the stop portion providing a horizon separation of the throttle cable conduit connection portion from the mid portion of the thumb lever when viewed from above.

2. The throttle control system of claim 1, wherein when viewed from the side in the direction along the axis of the cylindrical handlebar opening, the traversing portion of the lower lever arm is vertically spaced from the throttle block providing a vertical clearance between the throttle block and the traversing portion of the lower lever arm.

3. The throttle control system of claim 2, wherein the throttle block has a handlebar engagement portion that is configured with a plurality of ribs or projections that provide a plurality of air gaps between the exterior surface of the handlebar and the handlebar engagement portion.

4. The throttle control system of claim 1, wherein one or both of the throttle block and thumb lever have wire management structure comprising a pair of unitary walls defining a channel at a bottom side of the throttle block and/or thumb lever.

5. The throttle control system of claim 1, wherein the throttle block portions are clampable to the handlebar with a plurality of screws extending upwardly through the lower portion into the upper portion, and wherein the pivot pin is a screw that extends through a lower arm of the pair of lever arms of the thumb lever, through the upper portion and into an upper arm of the pair of lever arms of the thumb lever.

6. The throttle control system of claim 1 wherein the two throttle block portions and the thumb lever are comprised of glass filled nylon or a carbon fiber matrix with a polymer resin.

7. A throttle control system for a snowmobile comprising:

a throttle block having an upper portion and a lower portion defining a generally cylindrical handlebar opening for clamping to a snowmobile handlebar at a right hand grip, the throttle block having a forward portion that is positioned forward of the handlebar and a rearward portion that extends rearwardly from the handlebar when the throttle block is mounted on the handlebar, the rearward portion having a throttle cable conduit connection portion;

a thumb lever having a proximal portion with a pair of lever arms, an upper lever arm and a lower lever arm, each with a forwardmost end pivotally attached to the forward portion of the throttle block defining a pivot axis, the thumb lever further having a mid portion with a throttle cable wire connection portion, and a distal portion with a thumb gripping portion;

wherein when thumb lever and throttle block are mounted on the handlebar, the thumb lever has an undepressed position where the midportion is confronting the throttle cable conduit connection portion of the throttle block, the thumb lever depressible to a position away from the undepressed position;

wherein the upper portion of the throttle block comprises an upwardly extending boss and wherein the lower portion comprises a downwardly extending boss, wherein a pivot pin hole extends through the upwardly extending boss and the downwardly extending boss, the upwardly extending boss and the downwardly extending boss providing separation of the thumb lever arms from the throttle block above and below the handlebar when the throttle block is attached to the handlebar.

8. A throttle control system for a snowmobile comprising a throttle block clampable to the snowmobile handlebar, the throttle block having a body portion that clamps about the handlebar and a forward portion positioned forward of the handlebar with a pivot pin, a thumb lever pivotally connected to the throttle block at the pivot pin, the thumb lever having two traverse arms extending above and below the body portion of the throttle block that clamps about the handlebar, wherein the throttle block has a raised portion extending from the pivot pin to a throttle cable conduit connection portion placed opposite the handlebar from the pivot pin, and except for at the pivot pin, the raised portion is displaced from the thumb lever when viewed from above such that the thumb lever arms do not overlap with the raised portion except at the pivot pin.

9. The throttle control system of claim 8, wherein the raised portion and an upper arm of the thumb lever arms are horizontally separated when viewed from above, the horizontal separation being at least $3/8$ of an inch and wherein said separation increases when the thumb lever is depressed.

10. The throttle control system of claim 8, wherein when viewed from above, the raised portion forms a C-shape with one leg extending to the pivot pin and another other leg providing a stop for the thumb lever.

11. The throttle control system of claim 10, wherein the stop engages a mid portion of the thumb lever that has a flat surface facing the stop and further has a throttle cable wire connection portion.

12. The throttle control system of claim 8, wherein the body portion of the throttle block has a plurality of ribs or projections for engaging the handlebar and for reducing the surface of the throttle block that contacts the handlebar for reducing the heat transfer from the handlebar to the throttle block from a hand grip heater.

13. The throttle control system of claim 12, wherein the body portion is comprised of a polymer that has a lower heat capacity than steel or aluminum.

14. A throttle control system for a snowmobile comprising a throttle block clampable to the snowmobile handlebar, the throttle block having a body with a generally cylindrical opening with an axis that clamps about the handlebar, the throttle block further having and a forward portion positioned forward of the handlebar, the throttle control system further comprising a thumb lever for controlling the throttle, the thumb lever pivotally connected to the throttle block at the forward portion, the thumb lever having an upper lever arm with a traverse portion that traverses the handlebar above the handlebar, the traverse portion extending above and vertically spaced from the throttle block when viewed from the side along the axis, the thumb lever further having a lower lever arm with a traverse portion that traverses the handlebar below the handlebar, wherein the traverse portion of the upper lever arm and the traverse portion of the lower lever are displaced horizontally from the throttle block when viewed from above when the thumb lever is not depressed, wherein when the thumb lever is depressed the horizontal displacement increases when viewed from above.

15. The throttle control system of claim 14, wherein the body of the throttle block has a plurality of projections configured as ribs or nubs for engaging the handlebar and for minimizing the surface of the throttle block that contacts the handlebar for reducing the heat transfer from the handlebar to the throttle block from a hand grip heater.

16. The throttle control system of claim 15, wherein the body is formed of nylon and comprises two half portions screwed together.

17. The throttle control system of claim 14, wherein the throttle block comprises a pair of half portions and wherein the half portions have an arcuate shape to follow the curvature of the exterior surface of the handlebar, and wherein when the thumb lever is depressed, the thumb lever does not overlap with the arcuate shape of the body that extends over the handlebar when viewed from above.

18. The throttle control system of claim 14, wherein a vertical gap between the throttle block body above the handlebar and the upper lever arm of the thumb lever is at least $\frac{1}{8}$ of an inch when the thumb lever is not depressed when viewed from the side along the axis.

* * * * *